R. J. CARRUTH AND P. E. PENDLEY.
AUTOMOBILE ATTACHMENT.
APPLICATION FILED SEPT. 10, 1918.
1,326,439.
Patented Dec. 30, 1919.
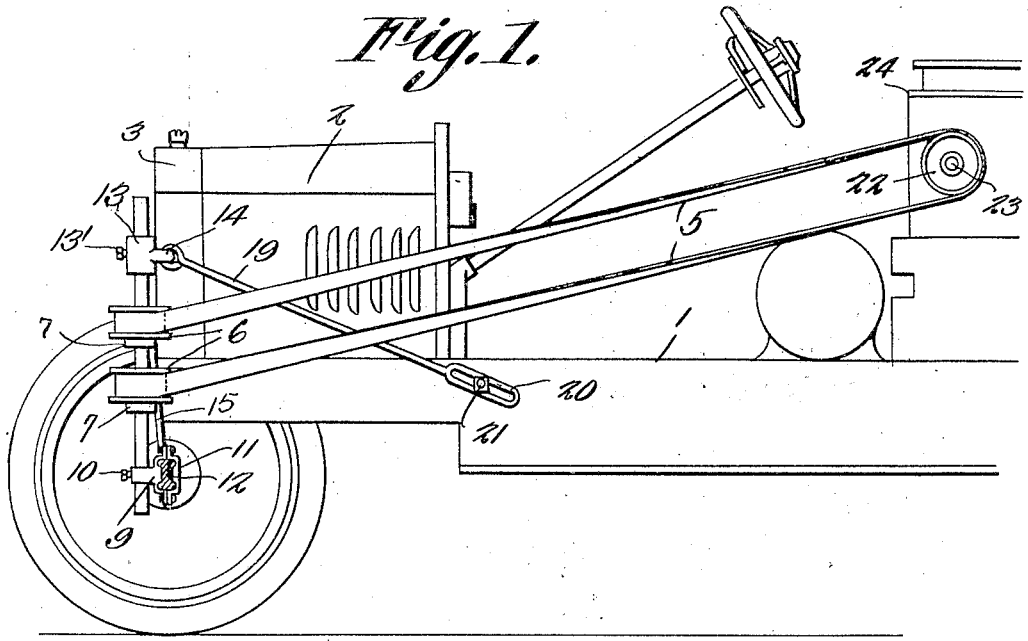
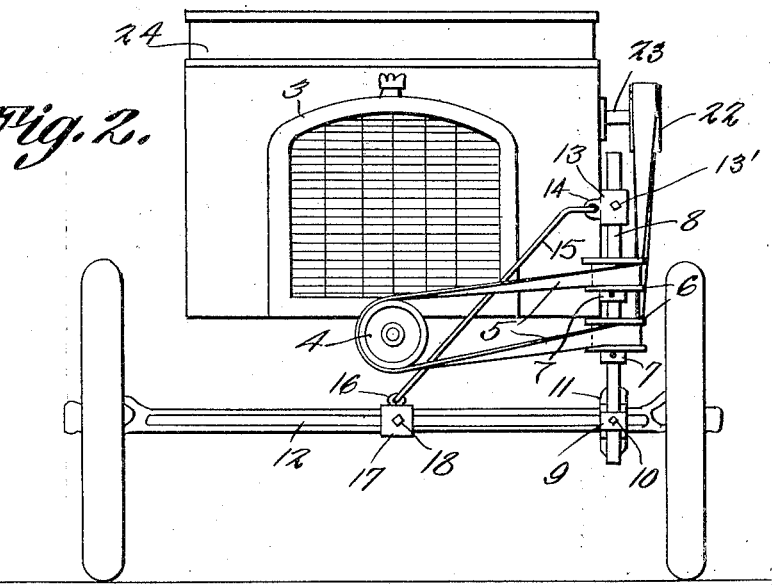

UNITED STATES PATENT OFFICE.

ROBERT J. CARRUTH AND PERRY E. PENDLEY, OF ATLANTA, GEORGIA.

AUTOMOBILE ATTACHMENT.

1,326,439.           Specification of Letters Patent.      Patented Dec. 30, 1919.

Application filed September 10, 1918. Serial No. 253,451.

*To all whom it may concern:*

Be it known that we, ROBERT J. CARRUTH and PERRY E. PENDLEY, citizens of the United States, residing at Atlanta, in the county of Fulton, State of Georgia, have invented a new and useful Automobile Attachment, of which the following is a specification.

The subject of this invention is an attachment for automobiles or other motor driven vehicles.

Because of the time lost in transporting separators from farm to farm, especially where the farms are small and the crop to be thrashed is necessarily small, it is desirable that some means be devised for transporting separators and like machines with greater rapidity. It is also desirable that the machines be capable of being set and ready to start operations with as little delay as possible.

To provide a machine which will answer the foregoing requirements and at the same time give the farmer a truck or automobile which may be used at all times of the year is the aim of the present invention.

A main object of the invention is the provision of means for gearing the motor of a motor vehicle to mechanism mounted on such vehicle, for the purpose of operating such mechanism.

Another object of the invention is the provision of guide pulleys and means for supporting such pulleys in selected positions.

The invention also contemplates generally improving the construction and enhancing the utility of attachments of this character.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1 is a fragmentary view in side elevation, part in section, of a motor truck equipped with an attachment constructed in accordance with the invention;

Fig. 2 is a front elevation of the same.

Referring to the drawings by numerals of reference:—

The chassis of an ordinary automobile truck is shown at 1, and upon the forward end thereof is mounted the hood 2 which incloses the motor of the vehicle. The radiator of the motor cooling system is shown at 3. A pulley 4, or similar element for delivering power, is secured to the crank shaft of the motor and located forwardly of the radiator, and a belt or other connector 5 passes about this pulley.

Idlers 6, herein shown as flanged pulleys, serve to direct or guide the belt 5 about the front corner of the motor vehicle that it may be led down the side thereof. These idlers are mounted for rotation on a rod or shaft 8, and are held in place thereon by collars 7.

The rod 8 is mounted for vertical adjustment in an aperture formed in a forwardly projecting lug of the casting 9, and is held in adjusted position by means of a set screw 10. The casting 9 is secured by bolts or otherwise to a supplemental casting 11, the castings being bound by the bolts upon the front axle 12 of the motor truck.

A collar 13 encircles the rod 8 near its upper end, and this collar is secured in selected position on the rod by means of a set screw 13' or the like. The collar is provided with two ears, 14, extending radially therefrom, and positioned substantially ninety degrees apart. The ears 14 are apertured, one of them to receive for pivotal attachment the upper end of a stay rod 15, the lower end of which has pivotal engagement with an apertured ear 16, formed on a casting 17, which encircles the axle 12, and is secured in adjusted position thereon in any suitable manner, as by the set screw 18.

The other ear 14 is pivotally engaged by one end of a stay rod 19, the other end of which is slotted longitudinally, as at 20, for the reception of a bolt 21 or the like, which serves to adjustably secure this end of the rod to the side of the chassis of the truck or automobile.

The belt 5, after passing about the guide pulleys 6, extends longitudinally of and beside the vehicle, and is herein shown as led over a pulley 22, fast on the extending end of a shaft 23 of a machine 24. The machine 24 may be a separator, saw mill, or other device adapted to be run by motor power.

From the foregoing it will be apparent that the supporting rod or shaft 8 may be adjusted longitudinally of the axle 12 so as to bring the guide pulleys 6 into proper position to direct the belt 5 onto the pulley 22, and may also be adjusted vertically to avoid undue bending of the belt.

Having thus described the invention, what is claimed as new and sought by Letters Patent, is:—

1. In combination with a motor vehicle, a bearing longitudinally adjustable on one of the vehicle axles, a shaft longitudinally adjustable in the bearing and extending vertically therefrom, elements on the shaft for guiding an endless belt, a bearing adjustable upon the opposite end of the shaft, a pair of downwardly extending supporting rods pivotally connected with the latter bearing, one of which extends rearwardly of the vehicle and is longitudinally adjustably attached thereto, and a casting longitudinally adjustable on the axle and having pivotal connection with the lower end of the other supporting rod.

2. An automobile attachment including a vertical shaft, a clamp adjustably secured to the shaft and attachable to the front vehicle axle, said shaft being adapted for vertical adjustment, guide pulleys mounted for rotation on the shaft, a pulley on the engine shaft, a machine to be driven, a belt trained around said pulleys and adapted for connection with said machine to be driven, a sleeve adjustable on the shaft, stay rods pivotally secured to the sleeve, and adjustable clamps for securing the stay rods to the vehicle.

3. An attachment for automobiles for driving machinery, including a shaft, a clamp adjustably secured to the shaft and supporting the same in a vertical position on the axle of the vehicle, a sleeve adjustable on the shaft, a stay rod pivotally secured to the sleeve and having adjustable connection with the axle, a second stay rod pivotally secured to the sleeve at right angles to the first mentioned stay rod and having adjustable clamping engagement with one side of the vehicle, idlers on the shaft, and a drive connection between the motor of the automobile and the machine to be driven, said drive connection being guided by said idlers.

In testimony that we claim the foregoing as our own, we have hereto affixed our signatures in the presence of two witnesses.

ROBERT J. CARRUTH.
PERRY E. PENDLEY.

Witnesses:
 THOS. D. WHITE,
 J. W. THURMAN.